(12) United States Patent
Wang et al.

(10) Patent No.: US 9,025,587 B2
(45) Date of Patent: May 5, 2015

(54) AUTO ANSWER IN VOICE OVER INTERNET PROTOCOL

(75) Inventors: Kuansan Wang, Bellevue, WA (US); Xuedong Huang, Bellevue, WA (US)

(73) Assignee: Microsoft Technology Licensing, Redmond, WA (US)

( * ) Notice: Subject to any disclaimer, the term of this patent is extended or adjusted under 35 U.S.C. 154(b) by 2107 days.

(21) Appl. No.: 11/504,924

(22) Filed: Aug. 16, 2006

(65) Prior Publication Data
US 2008/0063169 A1 Mar. 13, 2008

(51) Int. Cl.
| | | |
|---|---|---|
| H04L 12/66 | (2006.01) | |
| H04L 29/06 | (2006.01) | |
| H04L 12/28 | (2006.01) | |
| H04L 12/56 | (2006.01) | |
| H04J 3/16 | (2006.01) | |
| H04J 3/22 | (2006.01) | |
| H04M 1/253 | (2006.01) | |

(52) U.S. Cl.
CPC ......... *H04L 65/4061* (2013.01); *H04M 1/2535* (2013.01); *H04L 65/1006* (2013.01); *H04L 65/1069* (2013.01); *H04L 65/1083* (2013.01)

(58) Field of Classification Search
USPC ............. 370/352, 401, 466; 455/78, 518, 509
See application file for complete search history.

(56) References Cited

U.S. PATENT DOCUMENTS

| | | | |
|---|---|---|---|
| 6,816,912 B1 | 11/2004 | Borella et al. | |
| 7,012,888 B2 | 3/2006 | Schoeneberger et al. | |
| 7,411,939 B1 * | 8/2008 | Lamb et al. ................... | 370/352 |
| 2004/0114747 A1 | 6/2004 | Trandal et al. | |
| 2004/0192364 A1 | 9/2004 | Ranalli et al. | |
| 2005/0143135 A1 | 6/2005 | Brems et al. | |
| 2005/0255811 A1 | 11/2005 | Allen et al. | |
| 2005/0289222 A1 | 12/2005 | Sahim | |
| 2006/0003740 A1 | 1/2006 | Munje | |
| 2006/0037072 A1 * | 2/2006 | Rao et al. ......................... | 726/14 |
| 2006/0084454 A1 | 4/2006 | Sung et al. | |
| 2006/0105794 A1 * | 5/2006 | Carlson et al. ................ | 455/518 |
| 2006/0285493 A1 * | 12/2006 | Manuja et al. ................ | 370/235 |

OTHER PUBLICATIONS

Allen, et al., "The P-Answer-State Header Extension to the Session Initiation Protocol (SIP) for the Open Mobile Alliance (OMA) Push to talk over Cellular (PoC)", http://scholar.google.com/scholar?hl=en&lr=&q=cache:A5VQ4jNQWbwJ:www.tech-invite.com/IDs/SIPPING-I/draft-allen-sipping-poc-p-answer-state-header-01.pdf++use+of+auto-answer+in+Session+initiati.
Camarillo, et al., "ISUP to SIP Mapping draft-ietf-sipping-isup-01", http://tools.ietf.org/pdf/draft-ietf-sipping-isup-01.pdf.
Kim, et al., "IMS-based Push-to-Talk over GPRS/UMTS", http://ieeexplore.ieee.org/iel5/9744/30731/01424902.pdf?isNumber=.
Wu, et al.,"A Client-Side Design and Implementation for Push to Talk over Cellular Service", http://liny.csie.nctu.edu.tw/wcmc05.pdf.
J. Rosenberg, RFC 3261 SIP: Session Initiation Protocol, Request for Comments, 2002, pp. 1-270, The Internet Society.

* cited by examiner

*Primary Examiner* — Melanie Jagannathan
*Assistant Examiner* — Stephanie Chang
(74) *Attorney, Agent, or Firm* — Brandon Roper; Judy Yee; Micky Minhas

(57) ABSTRACT

An auto-answer feature is implemented in SIP by configuring a receiving device to automatically acknowledge and answer an incoming call or session from a specific trusted third party. The receiving device may skip to an OK response to an INVITE request when the call is routed through the trusted third party. When the device can automatically answer the incoming call, advanced features such as Push To Talk, Information Tone, Click to Call, and Remote Monitoring may be easily implemented.

20 Claims, 6 Drawing Sheets

AUTO ANSWER IN VOICE OVER INTERNET PROTOCOL

BACKGROUND

Session Initiation Protocol (SIP) is a widely adopted standard used for, among other things, Voice over IP (VoIP). SIP is used for session initiation, modification, and termination. Despite numerous revisions, SIP follows a common trend in VoIP protocol architecture and is designed primarily as a first party protocol, where the party executing the SIP commands is usually one of the parties involved in the communication.

The first-party design of SIP and other VoIP protocols makes certain advanced features difficult to implement. For example, Push to Talk also known as 'walkie talkie' features are difficult to implement in the current SIP standard and existing hardware. Other features such as an 'Information Tone', 'Click to Call', and 'Remote Monitoring' are similarly difficult to implement. In some cases, such features may be possible if extensions to the SIP standard were implemented.

SUMMARY

An auto-answer feature is implemented in a Voice over IP protocol such as SIP by configuring a receiving device to automatically acknowledge and answer an incoming call or session from a specific trusted third party. The receiving device may skip to an OK response to an INVITE request when the call is routed through the trusted third party whose identity is carried and authenticated in the protocol's message header. When the device can automatically answer the incoming call, advanced features such as Push To Talk, Information Tone, and features requiring third party call controls such as Click to Call and Remote Monitoring, may be easily implemented.

Push to Talk may be implemented as both a call to a single receiver or as a broadcast to several devices. Information Tone is a feature that may use an auto-answer call as an announcement of the incoming call. Click to Call is a way for a user to establish a call between a VoIP handset and another party through a separate computer, such as one which has the user's contact list. Remote Monitoring is a feature by which a call can be established to a remote device, and the remote device is used primarily to listen.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
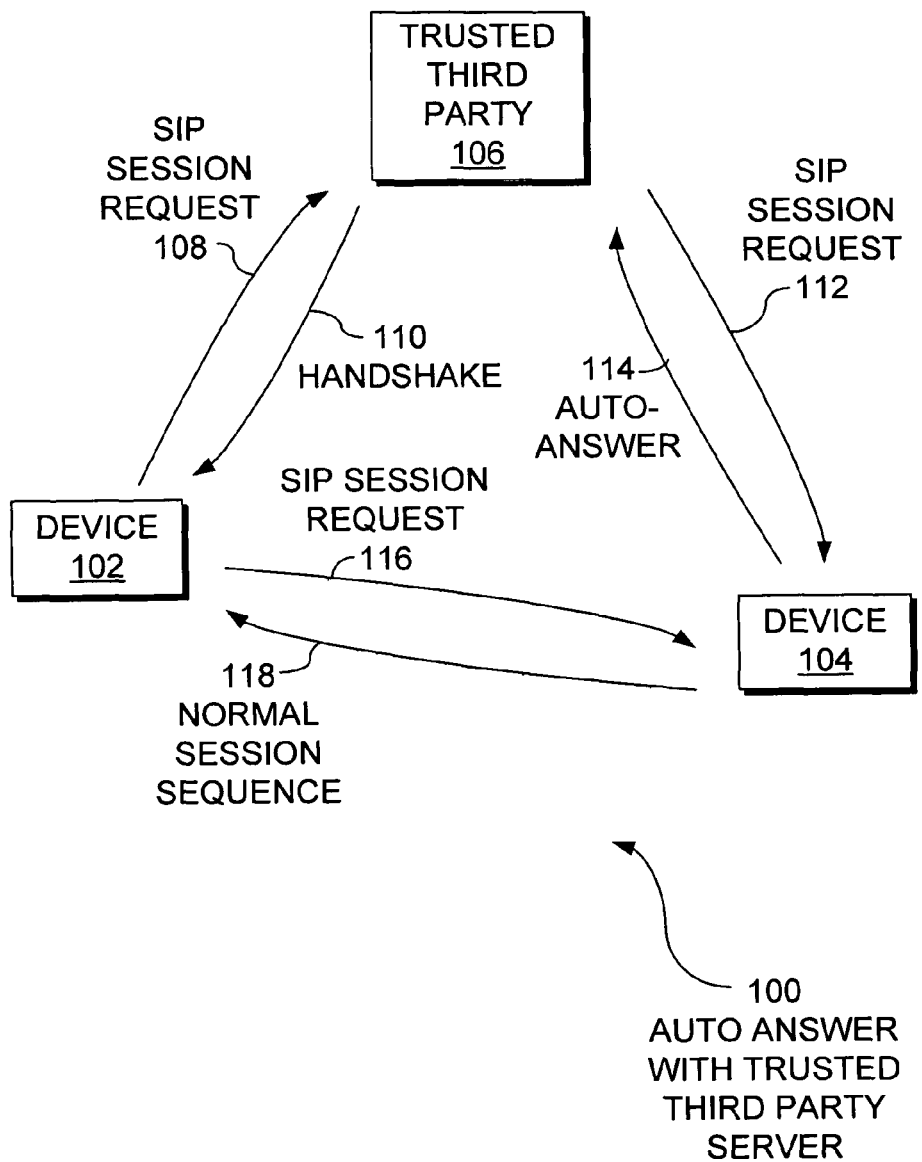
FIG. 1 is a diagrammatic illustration of an embodiment showing a system for auto answer using a trusted third party server.

Specific embodiments of the subject matter are used to illustrate specific inventive aspects. The embodiments are by way of example only, and are susceptible to various modifications and alternative forms. The appended claims are intended to cover all modifications, equivalents, and alternatives falling within the spirit and scope of the invention as defined by the claims.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing a system for auto answer with a trusted third party server. The device 102 can initiate an auto answer response from device 104 by going through a trusted third party server 106. In so doing, several advanced features can be performed without extending the current language and feature set of the VoIP protocols such as Session Initiation Protocol (SIP). The device 102 initiates a SIP session request 108 to the trusted third party server 106 and receives the handshake 110 in return to establish a communication session. The trusted third party server 106 sends a SIP session request 112 to device 104. Because the session request comes from the trusted third party server 106, the device 104 will auto-answer 114 and establish a session without requiring a user input on device 104.

If the device 102 were to send a SIP session request 116 directly to device 104, the normal session initiation sequence 118 would ensue, which normally requires a user input on device 104.

The auto-answer feature may be used to automatically establish a SIP session with a remote device. This feature may be used for several advanced functions including push-to-talk, information tone, click-to-call, and remote monitoring. Examples of embodiments of each of these features will be discussed later in this specification.

In a general sense, the SIP protocol has been designed to act similarly to a telephone system and is used for telephone-like communications over the internet or other networks. The SIP protocol generally involves a request that is sent to a receiving device. The receiving device may 'ring' much like an ordinary telephone. In order for the receiving device to establish a session, a user interacts with the device to answer the request. Once the second device has answered, the protocol can establish a working session. Throughout this specification, different terms may be used to describe the interaction between various devices, including telephony terms such as 'call' and 'ringing' and more generalized network communications terminology such as 'request', 'response', and messages. Applications for the auto-answer feature may include any application where SIP protocols are used, including VoIP telephony, video conferencing, instant messaging, or any other type of communication.

The various devices discussed in this specification may be any type of network connected device. The device may be a dedicated communication device such as a VoIP telephone handset, a mobile telephone receiver, video conferencing device, security camera, or other system directed to a communications use. In other embodiments, the device may be a general purpose device such as a desktop computer, handheld personal digital assistant, network communication appliance, or any other such device. In some embodiments, communications may be made from one type of device to another similar device, such as a video conference between one video conference machine to a similarly equipped machine on the other end. In other embodiments, one type of device may communicate with a different type of device. For example, a VoIP handset may be used to communicate with a desktop personal computer equipped with a microphone and speaker.

For the purposes of this specification, standard SIP commands are presented in all capital letters. This specification relies on and hereby incorporates by reference "Management Information Base for the Session Initiation Protocol (SIP)", internet-draft dated May 17, 2006, available on http://www.i-etf.org/. The references to SIP commands, methods, and objects herein are subject to the referenced document.

As part of the SIP protocol, each session begins with a message that includes a FROM field, which is the address or identifier of the sending device. In one embodiment of auto-answer, the receiving device may be configured to evaluate the FROM field of an INVITE message or request for a session. If the FROM field is from a trusted third party, the device may establish a session without a user input. If the FROM field is from a different sender, the normal SIP protocol will be followed. Such a configuration may be readily incorporated into a VoIP phone or other similar device while still using the existing SIP command structure.

The SIP session request 108 may cause the trusted third party 106 to initiate an auto-answer session with device 104 by several different mechanisms. One mechanism is that the request 108 comprises an embedded address for device 104 in the body of the message. The trusted third party 106 may interpret the incoming request and initiate the SIP session 112 with the device 104. In such an embodiment, the trusted third party server 106 may receive requests for many devices for which it is the trusted third party.

Another mechanism may be to embed an address for the device 104 into the trusted third party address used in the SIP request 108. The trusted third party address may have a username, port, or other unique identification to which device 102 may send the request. The username, port, or other unique identification may operate as an alias for device 104 in auto-answer mode. For example, a normal request 116 may include an address such as user1@device104.com. An address in the SIP request 108 may be user1@device104.trustedthirdparty.com. The address may be sent to trustedthirdpary.com and interpreted as an auto answer request for device 104. The trusted third party 106 may interpret the incoming address as a request to start an auto-answer session with device 104.

The trusted third party 106 may be a server for which a user may register their device for auto answer features. In a push-to-talk scenario, a user may subscribe to a push-to-talk service and register a device with a trusted third party server. The user device may be programmed to add the push-to-talk trusted third party server to an internal list of trusted third party servers.

In another scenario, a device 104 may have one trusted third party server 106 assigned to it. When a user signs up for a service such as a push-to-talk service, the address of the device's trusted third party server may be given to the push-to-talk service so that future auto answer requests may be directed to the device's trusted third party server.

Figure 2:
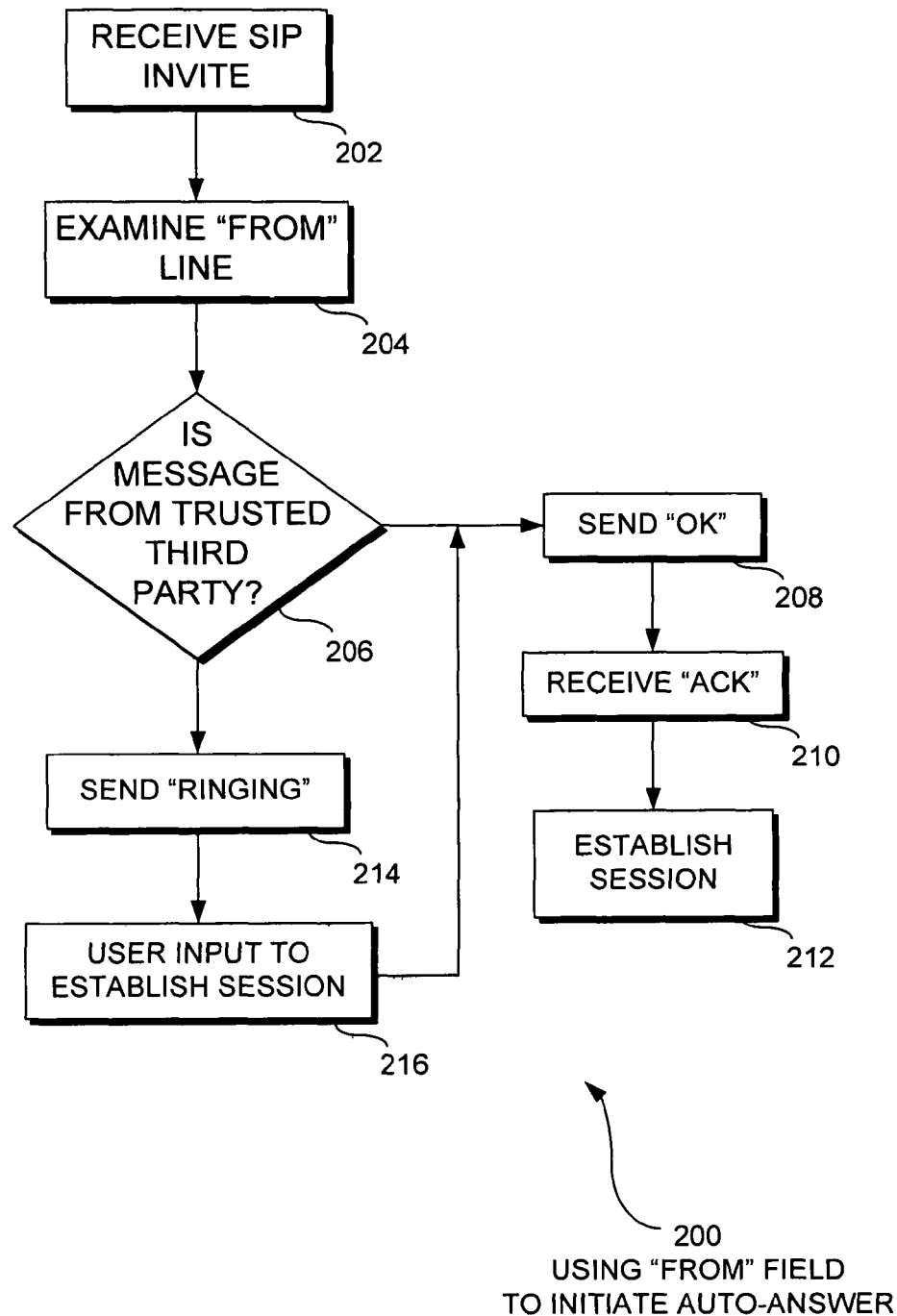
FIG. 2 is a flowchart illustration of an embodiment showing a sequence for using the FROM field of a SIP session request to initiate auto answer.

FIG. 2 is a flowchart illustration of an embodiment 200 showing a method for using the FROM field of a SIP request to initiate auto-answer. The embodiment 200 is illustrated from the standpoint of the receiving device. The device receives a SIP INVITE in block 202. The FROM field is examined in block 204. If the request is from a trusted third party in block 206, an OK is returned in block 208. The OK response of block 208 will elicit an ACK from the requesting device in block 210 and a SIP session is established in block 212. If the request is not from a trusted third party in block 206, the device sends the RINGING response in block 214. When the user answers the call or otherwise creates an input to establish the session in block 216, the process continues with an OK in block 208.

Embodiment 200 exemplifies the logic that can be implemented in a device for performing an auto-answer sequence using the current SIP command set. The device examines the FROM field of every incoming request for a SIP session and if the message is sent from a trusted third party, a SIP session is established without user interaction.

In some cases, a device may have several trusted third party devices and may perform a lookup of the incoming message's FROM field against a database or list of trusted third parties. In other cases, an incoming message may use a specific format, include a keyword, or have a specific sequence to identify the message as coming from a trusted third party. In such cases, the specific format, keyword, or sequence may be a second check that the auto answer request is valid.

Figure 3:
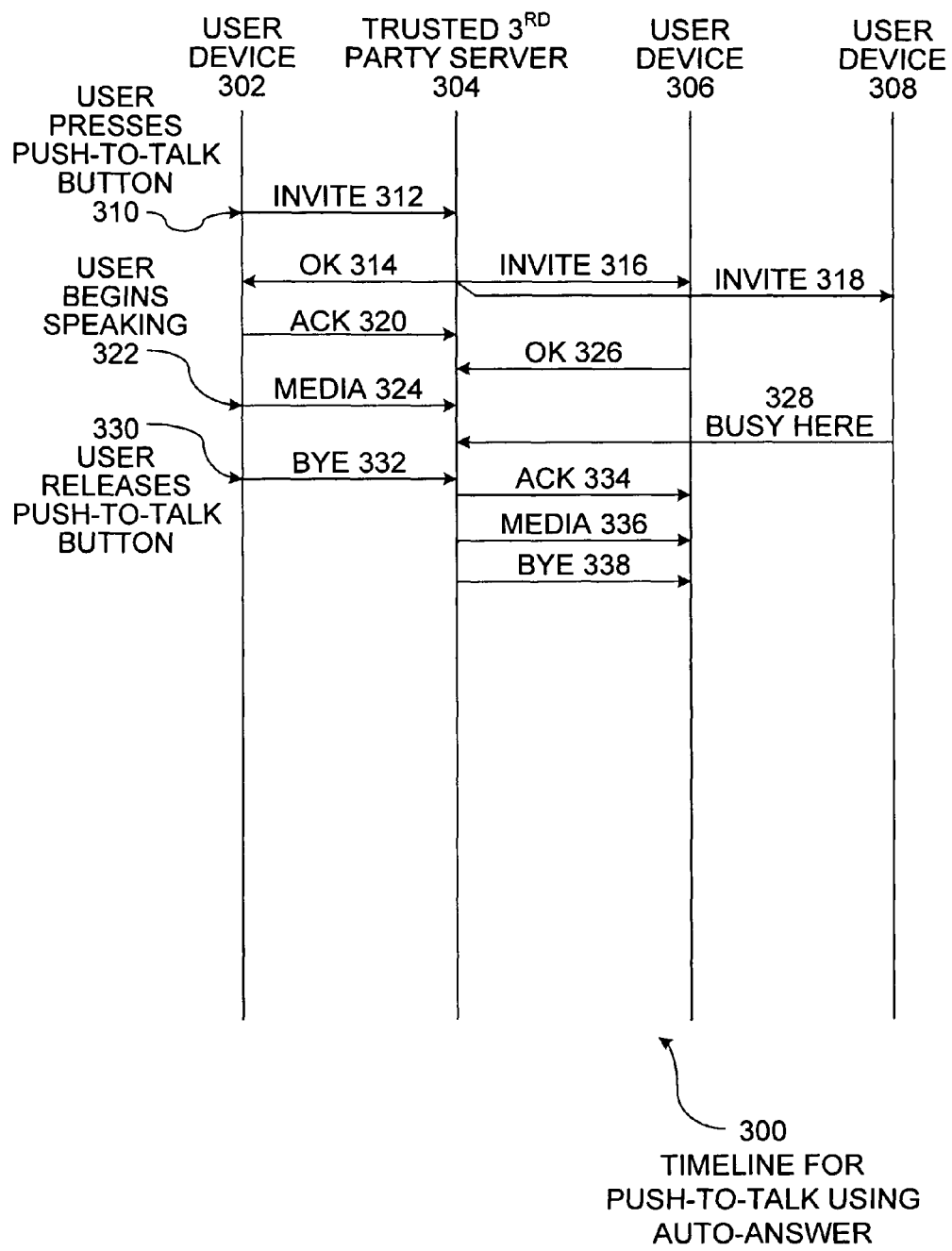
FIG. 3 is a timeline representation of an embodiment showing sequence of messages for a push-to-talk transmission using auto answer.

FIG. 3 is a timeline illustration of an embodiment 300 showing a push-to-talk feature may be implemented using auto-answer. The embodiment 300 illustrates a push-to-talk feature where a user device 302 communicates through a trusted third party server 304 to attempt to send a push-to-talk message to a recipient user device 306 and recipient user device 308. The embodiment 300 illustrates the major transactions that may occur during a push-to-talk transmission but does not recount every detailed interaction between the various devices.

The user of device 302 depresses a push-to-talk button at point 310, which sends a SIP INVITE request 312 to the trusted third party server 304, which responds to the device 302 with an OK 314 and sends an INVITE 316 to device 306 and INVITE 318 to device 308. In response to the OK 314, the user device 302 responds with ACK 320 to trusted third party server 304 and a SIP session is established between the device 302 and the trusted third party server 304.

The user of device 302 begins speaking at point 322 and creates the media 324 that comprises the push-to-talk transmission. When the user releases the push-to-talk button at point 330, the device 302 transmits a BYE 332 command to the trusted third party server 304, thus ending the SIP session.

Because the user device 306 received the INVITE 316 from the trusted third party server 304, the device 306 responds with OK 326, which elicits an ACK 334 and establishes a SIP session without user intervention or input. Note that if the INVITE 316 came from a different device, the device 306 would have responded with a RINGING indicator and only sent the OK 326 after-user interaction.

When the user device 308 received the INVITE 318, the device 308 was busy. Hence, the device 308 returns a BUSY HERE 328 indicator and does not establish a SIP session.

After establishing the SIP session between the trusted third party server 304 and the device 306, the trusted third party server 304 transmits the media 336 and BYE 338.

In the embodiment 300, a push-to-talk transmission is sent by first establishing a SIP session between the device 302 that creates the transmission to a central server 304. The server 304 attempts to create separate auto-answer SIP sessions for each of the intended recipient devices. In the cases where the SIP sessions are successfully established, the message is automatically transmitted to the recipient devices without user input on the receiving device.

In a push-to-talk transmission, a first user creates a message that is broadcast to one or more recipient devices in a half duplex mode. The message is created and transmitted by pushing a button or key on the transmitting device while the user speaks the message. In some cases, the user may select one or more intended recipients prior to the transmission being recorded or sent.

The receiving devices of the push-to-talk transmission generally receive and play the message without any user input. Thus, the auto-answer system may be used to automatically enter a SIP session, play the incoming push-to-talk message, and then have the SIP session terminate.

Figure 4:
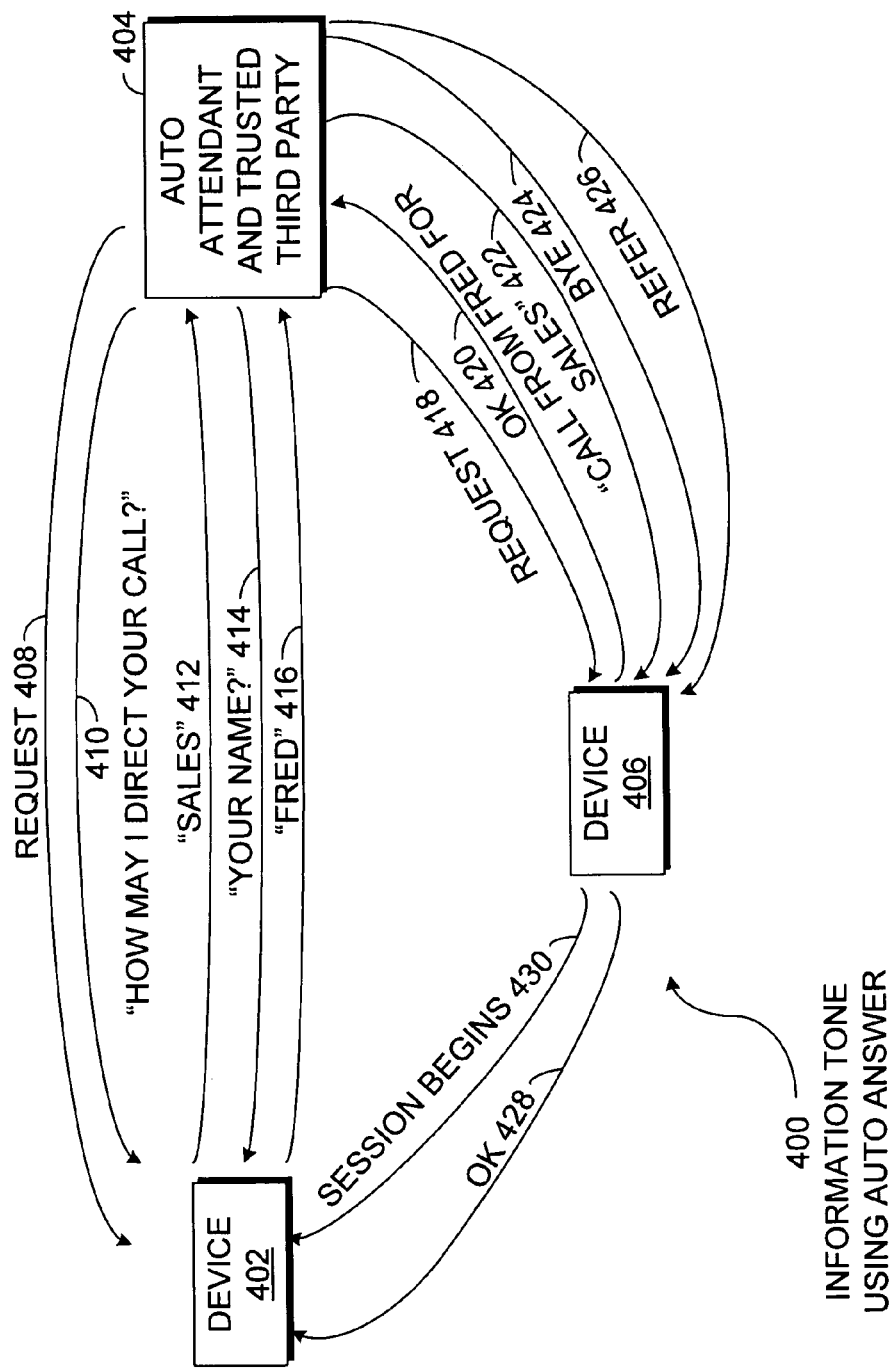
FIG. 4 is a diagrammatic illustration of an embodiment showing an implementation of information tone using auto answer.

FIG. 4 is a diagrammatic illustration of an embodiment 400 showing auto-answer being used by an information tone feature. An information tone feature uses an informational message in place of a ringing indicator when a call is incoming. An example is a call that originates with device 402 and is initially answered by an auto-attendant 404, which gathers information about the incoming call, sends a message to device 406 regarding the incoming call, and then transfers the call to the device 406.

The device 402 begins with a request 408 to the auto attendant 404. The auto attendant 404 replies with "How may I direct your call?" 410. The device 402 replies with "Sales" 412. The auto attendant 404 requests "Your name?" 414 and the device 402 replies with "Fred" 416. The auto attendant 404, acting as a trusted third party, then places a request 418 with the device 406. Because the auto attendant 404 is a trusted third party, the device 406 replies with OK 420 immediately without any user intervention. This establishes a SIP session between the auto attendant 404 and the device 406. The auto attendant 404 sends an information tone that contains the message "Call from Fred for sales" 422. The auto attendant 404 then sends a BYE command 424 to terminate the SIP session and refers the initial call 426 from device 402 to device 404. The device 404 issues an OK 428 to the refer request 426 when the user of device 404 picks up a handset or otherwise accepts the transferred call, and the session begins 430 between devices 402 and 406. If the user of device 404 did not pick up the call, a timeout would have terminated the transferred request.

Embodiment 400 is an example of a call transfer situation where an incoming call may be received by an attendant, who puts the first caller on hold, makes a short announcement to the intended recipient, and transfers the call to the recipient's phone. The recipient then interacts with the call to accept the call and begin speaking with the caller.

Embodiment 400 uses an automatic device for receiving a call, generating a message, sending the message to the recipient, and transferring the call. In other embodiments, the same process may be performed by a live person such as an operator or receptionist. The live operator may create the message "Call from Fred for Sales" 422 by speaking the phrase into a handset.

In some embodiments, the information tone message transmitted to the device 406 may be created from snippets of audio such as "Sales" 412 and "Fred" 416. Some such embodiments may concatenate the audio snippets with some prerecorded audio to create an automatically generated information tone. In other embodiments, the information tone message may be automatically generated from various fields in the request 408 and voice synthesis, prerecorded audio, or other mechanisms. In still other embodiments, the information tone message may be entirely created from audio, video, or other input from the user of device 402.

The auto attendant and trusted third party 404 may consist of two separate and distinct devices connected by a network. An auto attendant device may receive the initial call, generate the information tone message, and send the message to the trusted third party, which would in turn send the message to the recipient. In embodiment 400, the two functions may be combined into a single device.

The auto answer feature of device 406 is used to establish a SIP session to send the information tone message 422, which is then played for the recipient user on device 406. A single SIP session is created between the auto attendant 404 and the device 406 for the purposes of sending and playing the information tone message that announces the incoming call.

The term 'information tone' is used to describe a ringing tone or generalized announcement that contains some sort of specific information in the announcement of a call. In a simple embodiment, the information tone may be a specific ringing signal for a certain type of call, such as a high pitched ringing tone for an incoming call from an important client or a low warbling tone for a call transfer within an office. In a more complex embodiment, the information tone may have an audio description of an incoming call as well as a textual or video description that is displayed on the recipient device. By using an 'information tone', some information about the incoming call may be presented to the recipient to allow the recipient to determine if the recipient should answer the incoming call or give the recipient some information prior to beginning a conversation.

Figure 5:
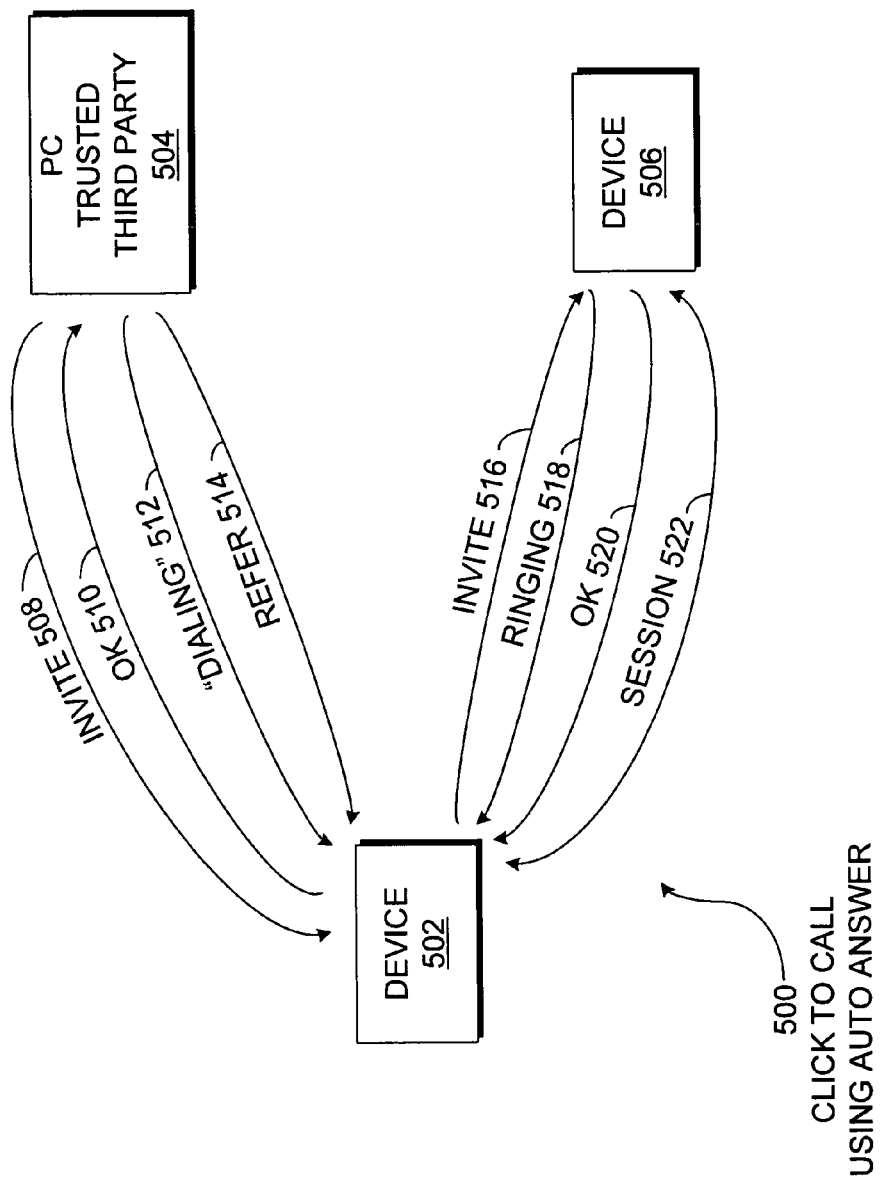
FIG. 5 is a diagrammatic illustration of an embodiment showing an implementation of click to call using auto answer.

FIG. 5 is a diagrammatic illustration of an embodiment 500 showing a 'click to call' sequence using auto answer. 'Click to call' is a term that describes setting up a communication between two devices by a third device. One example may be to select a recipient from a contacts list on a personal computer and press a 'dial' button. The personal computer may initiate the call from the user's phone or other device to the recipient's device.

In embodiment 500, the device 502 has a pre-established relationship with the trusted third party 504, and a call is established by the personal computer and trusted third party 504 between the device 502 and the recipient's device 506. Using the personal computer and trusted third party 504, a user may select the device 506 from a list on the personal computer 504 and initiate a call. The personal computer 504 may issue an INVITE command 508 to the device 502. Because the INVITE command 508 came from the personal computer and trusted third party 504, the device 502 may respond with an OK response 510 without requiring a user interaction with device 502. The personal computer 504 may respond with a "Dialing" indicator 512 and issue a REFER command 514 to redirect the session to device 506.

The device 506 may receive an INVITE 516 from device 502, and may respond initially with a RINGING response 518. When the recipient accepts the call on device 506, the device 506 may send an OK 520 and a SIP session 522 is initiated between the two devices.

The auto answer feature is used to establish a SIP session between the personal computer and trusted third party 504 and the device 502. Once the session is established, the personal computer 504 may essentially transfer the call to the recipient device 506. Because of the auto answer feature, the caller's device 502 appears to establish the call to the recipient's device 506, but the call was actually set up by the personal computer 504.

In embodiment 500, a third device is used to establish the call from a first device to a second device. Such a sequence may be used in an office environment where a user selects a person to call from a contacts list on a personal computer, but the sequence may be used in many other environments. For example, a web based interface may be used to enter a user's number and have a remote server establish a call to a recipient device without the user knowing the destination number or address. Such an example may be useful for customer service situations or any of a plethora of applications where it is desirable to have a remote device automatically place a call or otherwise establish a SIP session between two other devices.

As in any of the examples used in this specification, a trusted third party may be an additional device. For example, the personal computer used in the present example of a click-to-call feature may route auto answer requests through a separate trusted third party device to establish the auto answer session. The personal computer and trusted third party are combined in this embodiment as well as other embodiments for clarity.

Figure 6:
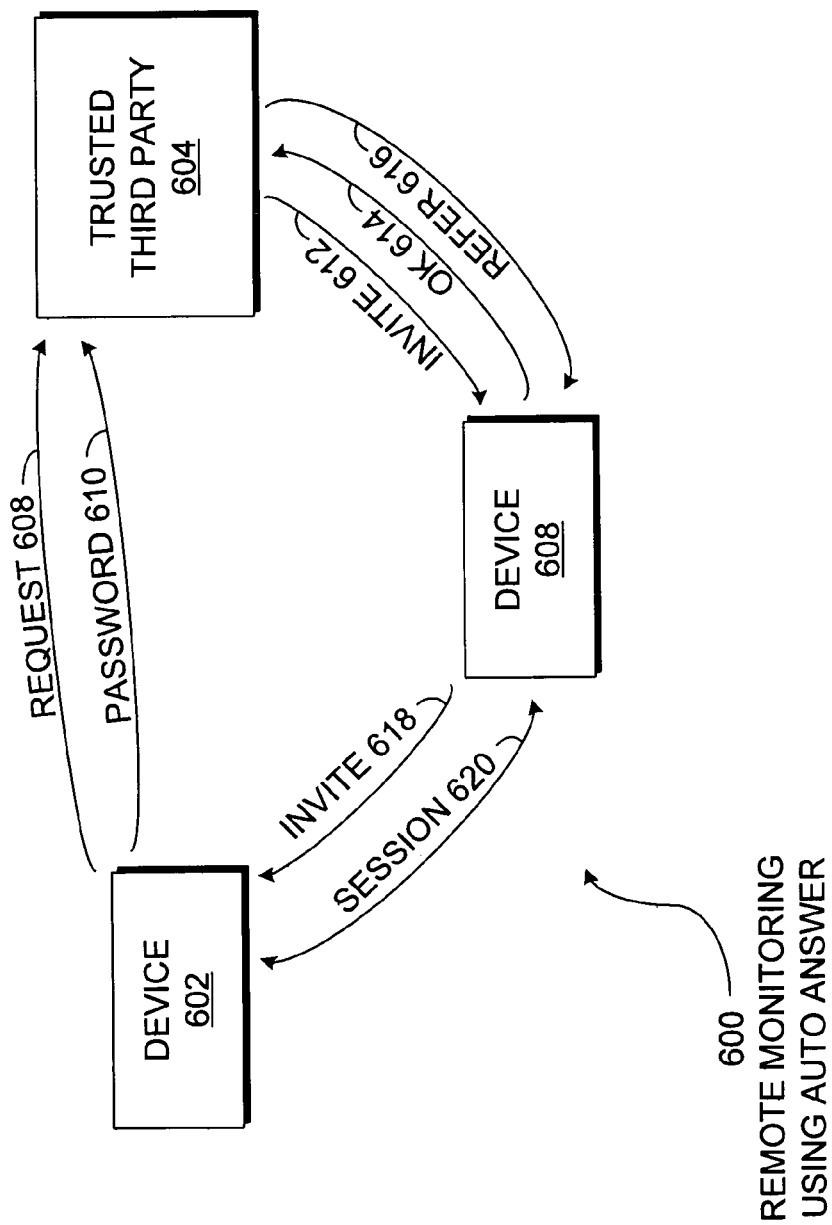
FIG. 6 is a diagrammatic illustration of an embodiment showing an implementation of remote monitoring using auto answer.

FIG. 6 is a diagrammatic illustration of an embodiment 600 of a remote monitoring feature implemented using auto answer. In remote monitoring, a user may initiate a call to a remote phone or device and listen to the device without necessarily notifying a person or people in the area. In a typical use, a parent may place a call to home and monitor a child's activities without requiring the child to answer the phone first. In another use, a security or medical monitoring service may call a subscriber's residence and monitor any sounds or receive images in the residence to check on a subscriber's safety and health.

The embodiment 600 begins with a calling device 602 placing a request 608 and possibly a password 610 to the trusted third party device 604. Based on the request, the trusted third party 604 may send an INVITE 612 to the remote device 608. Because the INVITE 612 came from the trusted third party 604, the device 608 may return an OK 614 and establish a SIP session without any user intervention on the device 608. Having established the session with the trusted third party, a refer command 616 may cause the device 608 to send an INVITE 618 to the device 602, whereupon the user would respond and a session 620 would be created.

In the embodiment 600, the user sends a request to the trusted third party 604 to set up a remote monitoring session. The trusted third party 604 establishes a SIP session with the remote device 608 but without any user intervention on device 608. The SIP session is then referred to the caller's device 602. The refer sequence essentially may cause the device 608 to call the device 602. In operation, the user at device 602 may send a request to the trusted third party 604, disconnect the call, and wait for the device 608 to call back. After receiving the return call from device 608, the user at device 602 may quietly monitor the device 608 or may send audible queries to assess the health and safety of the people within earshot of the device 608. Other uses for the remote monitoring function may include electronic surveillance, remote sensing, or any other situation where a SIP session is established with a remote device without a user interaction on the remote device.

Auto answer is a technique whereby information in the FROM portion of the initial request for a SIP session is used to automatically establish the SIP session without user interaction. The request may be routed through an actual trusted third party router or server, or a 'virtual' trusted third party server may be established through the use of aliases or other indicator on a transmitting device address. When such a technique is available, several useful and interesting features may be implemented. Such features include push to talk, information tone, click to call, and remote monitoring. Those skilled in the arts may find additional useful applications for auto answer as well. Although the auto answer examples are described and illustrated using SIP as the primary protocol, those skilled in the art should find it straightforward to apply the present embodiment to any VoIP or internet based communication protocols that the session initiation party is clearly identified in the protocol.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method comprising:
    establishing a first communication session between a first device and a trusted third party device; and
    initiating a second communication session between the trusted third party device and a second device, the second device being configured to detect that the trusted third party device initiates the second communication session by analyzing a FROM statement within the header of a Session Initiation Protocol (SIP) session request, the FROM statement of the request not containing any Internet Protocol addresses, to identify the trusted third party device and determine that the trusted third party device is a trusted third party, the second device being further configured to automatically accept and proceed to establish a communication link when a message is received from the trusted third party device to automatically answer a Voice over Internet Protocol (VOIP) call.

2. The method of claim 1 wherein said first communication session is initiated using SIP.

3. The method of claim 1 wherein the first communication session further comprises a push-to-talk transmission and wherein:
    a first transmission is sent from the first device to the trusted third party device; and
    a second transmission is sent from the trusted third party device to said second device, the second transmission being forwarded by the trusted third party device.

4. The method of claim 1 further comprising:
    initiating a third communication session between the trusted third party device and a third device, the third device being configured to respond with an OK when a message is received from the trusted third party.

5. The method of claim 4 wherein the third communications session further comprises a broadcast push-to-talk transmission.

6. The method of claim 1 further comprising:
    establishing a third communication session between the first device and the second device based on the second communication session, the second communication session comprising transmitting an address for the second device to the trusted third party device.

7. The method of claim 6 wherein the third communication session further comprises an information tone transmission.

8. The method of claim 7 further comprising:
    creating an announcement message wherein at least a portion of the announcement message comprises at least one from a group comprising an automated message and a recorded message.

9. A computer-implemented process for automatically answering a Voice over IP protocol call or session request, comprising:
    a second device detecting an initiated communication session from a trusted third party device and analyzing a FROM statement within a Session Initiation Protocol (SIP) session request, the FROM statement of the request not containing any Internet Protocol addresses, from the trusted third party device to identify the trusted third party device;
    the second device automatically accepting the communication session to automatically answer a Voice over Internet Protocol call or session request from a first device if the trusted third party device is identified to process communications with the first device through the trusted third party device.

10. The computer-implemented process of claim 9 wherein a communication session between the first device and the trusted third party device, or the communication session between the trusted third party device and the second device comprises a click-to-call session.

11. The computer-implemented process of claim 9 further comprising a remote monitoring session.

12. A trusted third party device comprising:
    a connection to a network;
    wherein the trusted third party device is adapted to:
        respond to a request from a first device and establish a first communication session between the trusted third party device and the first device;
        initiate and establish a second communication session with a second device, the second device being configured to detect that the trusted third party device initiates the second communication session, the second device being further configured to analyze a FROM statement within a Session Initiation Protocol (SIP) session request, wherein the FROM statement within the header of the request does not contain any Internet Protocol (IP) addresses, to identify the trusted third party device and to automatically respond with an OK when a message is received from the trusted third party, the second device being further configured to not automatically respond with an OK when a message is received from an untrusted third party.

13. The trusted third party device of claim 12 wherein the first communication session is initiated using SIP.

14. The trusted third party device of claim 12 wherein the trusted third party device is further adapted to:
    receive a first transmission sent from the first device to the trusted third party device; and
    transmit a second transmission sent from the trusted third party device to the second device, the second transmission being forwarded by the trusted third party device.

15. The trusted third party device of claim 12 wherein the trusted third party device is further adapted to perform push-to-talk transmission from the first device.

16. The trusted third party device of claim 12 further comprising:
    initiating a third communication session between the first trusted third party device and a third device, the third device being configured to respond with an OK when a message is received from the first trusted third party.

17. The trusted third party device of claim 16 further adapted to perform broadcast push-to-talk transmissions from the first device to the second device and the third device.

18. The trusted third party device of claim 12 further adapted to:
   establish a third communication session between the first device and the second device based on the second communication session, the second communication session comprising transmitting an address for the second device to the trusted third party device.

19. The trusted third party device of claim 18 further adapted to transmit an information tone transmission to the second device.

20. The trusted third party device of claim 12 further adapted to establish at least one of a group composed of a click-to-call session and a remote monitoring session.

* * * * *